Nov. 20, 1951   B. S. HALEY ET AL   2,575,953
PORTABLE SEATING UNIT
Filed April 5, 1946

INVENTORS
B. S. HALEY
E. B. CONRON
By: Fetherstonhaugh & Co
ATT'YS

Patented Nov. 20, 1951

2,575,953

UNITED STATES PATENT OFFICE 2,575,953

PORTABLE SEATING UNIT

Bernard S. Haley and Eleanor B. Conron,
London, Ontario, Canada

Application April 5, 1946, Serial No. 659,986
In Canada November 28, 1945

1 Claim. (Cl. 155—5)

This invention relates to portable units for supporting children in a seated or reclining position and in particular to a vehicle unit designed to convert a child's wagon to a structure of greater utility. This application is a continuation-in-part of my copending application Serial No. 631,684, filed Nov. 29, 1945, which application was later abandoned.

The invention can be particularly well illustrated by reference to children's wagons. Wagons of small size for young children, between the baby stage and four or five years old, present the hazard of permitting the child to fall from the wagon when seated therein. They are, however, very often employed as a means of transporting a child, because they provide a plaything for the child as well as a convenient mode of transportation, thus making it unnecessary on occasion to take along both a carriage and a cart. The adult or other person in charge, however, must necessarily be particularly careful and on the watch to prevent the child falling from the wagon. Moreover, where the child desires to sleep, the facilities provided by the wagon are not of the best. These difficulties can well be overcome in a simple manner as will be apparent from the present invention.

It is a main object of the present invention to provide a detachable unit embodying simple collapsible facilities which will safely hold a child in sitting posture or reclining posture.

A further object of the invention is to provide a collapsible seat construction which may be detachably fitted to a wagon and removed therefrom and conveniently carried in folded condition for use in other locations as may be required.

With these and other objects in view, the invention generally comprises a collapsible seating unit which may be detachably connected to the body of a child's vehicle. The invention embodies a base having side and end boards or ribs approximating that of a wagon body and including the side and end flaps connected thereto in the manner similar to their connection with the wagon body, whereby the unit may be inserted and detachably secured within the body of the wagon and readily removed therefrom for utility in other locations.

The invention will be clearly understood by reference to the following detailed specification taken in conjunction with the accompanying drawings.

Figure 1:
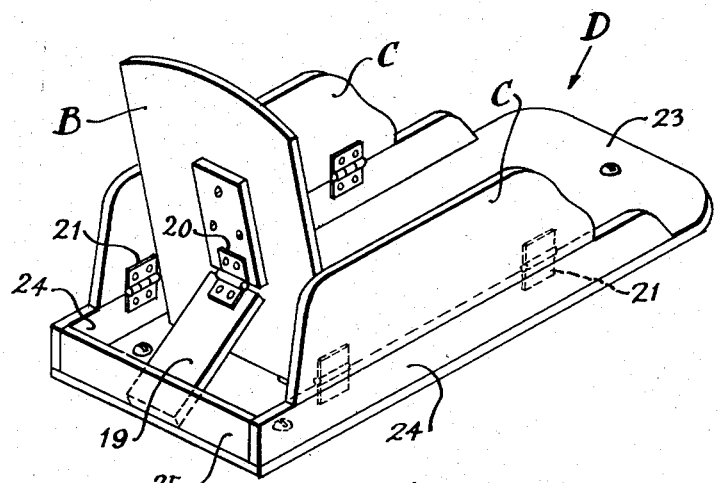
Fig. 1 is a perspective view of a detachable seat unit embodying a collapsible and portable seat for insertion in a wagon.

Referring to the drawings, the letter D indicates in general a detachable collapsible seat structure according to this invention. The unit includes a base 23, sideboards or raised side ribs 24 and an end board or rib 25. The back rest B is hingedly mounted as at 18 on the base 23 at a point spaced inwardly from the end board 25. A back support 19 is hingedly mounted as at 20 on the back rest B and is designed to swing outwardly therefrom to engage the base 23 of the unit at its point of juncture with the end board 25. This is designed to dispose the back piece substantially upright at a slight rearward incline, as shown in Fig. 1, thus comfortably to support the back of a child when sitting in the wagon normally.

Cooperating with the back rest B are the side flaps C. These are hingedly mounted as at 21 to the side boards 24 of the wagon and disposed to flank the back rest so that when the back rest is raised the side boards will be supported in the upright position by their contact with the side edges of the back rest B. Accordingly, therefore, when the child is seated in the wagon, it is impossible for him to fall out of it because he is supported by the back rest B and confined by the side flaps C which are hingedly mounted in such a way that they will not swing outwardly beyond the upright vertical position, as indicated in Fig. 1. In this particular instance, the lower edges of the side flaps are so mounted that in the upright position they rest upon and engage the upper edges of the side boards 24. Other means, of course, could be provided to maintain these side flaps from swinging outwardly beyond the vertical position.

Figure 4:
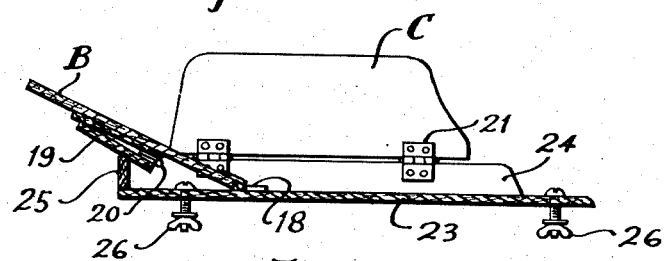
Fig. 4 is a longitudinal section taken through the detachable unit and illustrating the back rest in the reclining position.

For reclining it is only necessary to swing the back support 19 upwardly so that it will be disposed as shown in Fig. 4 and the back rest B then is lowered so that it will be supported by the end board 25, thereby maintaining it at an obtuse angle to the base 23 and forming a very comfortable resting position for the child when reclining. In this connection, the body of the child rising above the height of the side boards and engaging the side flaps maintains the side flaps in the upright position and assures that the child cannot be dislodged from his reclining position over the sides of the unit.

To set up the seat structure from the collapsed position, the back rest B is raised and its engagement with the side flaps will automatically cause the side flaps C to be raised to upright position and the back support 19 to drop to its supporting position. To collapse it, the back rest B is first swung inwardly to lie against the base 23 and the side flaps C are folded in on top of it. Actually, upon the release of the back rest B to its lowermost position, the side flaps C tend automatically to fall to their normal collapsed position.

Figure 2:
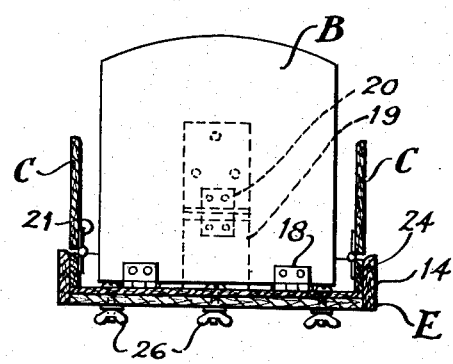
Fig. 2 is a transverse section taken through the body of a wagon and showing the unit snugly fitted therewithin.
Figure 3:
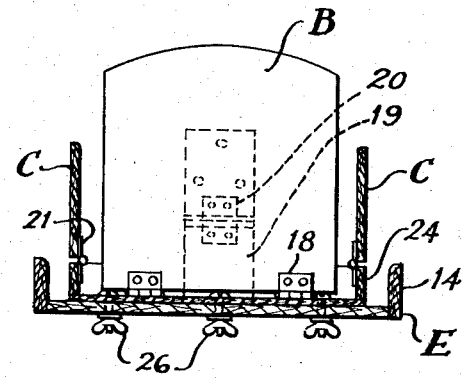
Fig. 3 is a transverse section similar to Fig. 7 showing a wagon body of a larger size.

The unit D may be fitted within the body E of a wagon, as shown in Fig. 2, so that the side walls 24 of the unit fit snugly inside of the side walls 14 of the wagon. The base 23 of the unit may be detachably secured in any suitable manner as, for instance, by the wing nut 26. It is not necessary, however, that the unit fit snugly within the side walls of the wagon since it may, as illustrated in Fig. 3, be disposed in spaced relation thereto. In this manner, therefore, an ordinary wagon may be converted into one designed to support a child in a seated or reclining position and reconverted into an ordinary wagon merely by removing the unit D.

It will be apparent from the foregoing that the construction permits a small child to be carried in a wagon of this type safely and in a position of extreme comfort. In this connection the back rest is disposed inwardly of the end board 15 a sufficient distance to permit the back rest to be firmly supported in a convenient manner at a suitable incline, as well as to permit its support in its lowermost position at a particularly comfortable incline to support the child comfortably when reclining. When the back rest B is so positioned, it is also far enough forward to distribute the weight of the child well over the four wheels, which permits the wagon to pull easily.

It will be apparent that the structure described provides facilities which will permit the wagon to be used in the normal manner as a plaything, but which can instantly be formed into one of particular utility for transporting the child in the normal course or when, during walking, the child becomes tired. Finally, it provides a very practical article which may be produced economically and which will fit in a motor car more readily than a carriage or other child's conveyance.

The unit may be taken out and carried in folded position conveniently so that it may be used apart from the wagon such as on the beach, or used as a unit in a car or other location for comfortably supporting the child in comparatively safe manner. The construction, therefore, has particular advantage since the wagon as indicated can be readily transported in a car and if for any reason it is not desired to take the complete wagon to various locations, the unit can be removed and used as a general utility element of the kind in question.

It is apparent from the foregoing that the present invention embodies a construction which may be conveniently adapted to various conditions of convenient utility.

It will be apparent, of course, that the structure may well be applied to sleighs of this general kind.

What we claim as our invention is:

A collapsible seat structure comprising a base, means for rigidly securing said base to a vehicle, two side flaps, one of said side flaps being hingedly connected to one side of said base, the other of said side flaps being hingedly connected to the other side of said base, a vertically extending end board rigidly connected to said base adjacent its back edge, a back rest hingedly connected to the top surface of said base in advance of said end board, a support bar hingedly connected to said back rest, the free end of said support bar being adapted to engage with said end board to support said back rest in an upright position, said support being adapted to hinge to lie against said back rest, said back rest being adapted to rest on said end board when said support is so folded to lie against said back rest.

BERNARD S. HALEY.
ELEANOR B. CONRON.

REFERENCES CITED

The following references are of record in the file of this patent:

UNITED STATES PATENTS

| Number | Name | Date |
| --- | --- | --- |
| 105,505 | Stagg | July 19, 1870 |
| 117,085 | Lawrence | July 18, 1871 |
| 987,895 | Long | Mar. 28, 1911 |
| 1,234,753 | Griswold | July 31, 1917 |
| 1,359,873 | Connor | Nov. 23, 1920 |
| 1,652,190 | Wills | Dec. 13, 1927 |
| 1,721,159 | Maneval | July 16, 1929 |
| 1,791,391 | Townsend et al. | Feb. 3, 1931 |

FOREIGN PATENTS

| Number | Country | Date |
| --- | --- | --- |
| 826,533 | France | Jan. 8, 1938 |

OTHER REFERENCES

Publication: Catalogue Gorton Toy Co., Sheboygan, Wis., 1938, page 23, Item 7,200.